United States Patent [19]
Hashimoto

[11] Patent Number: 4,795,112
[45] Date of Patent: Jan. 3, 1989

[54] METHOD AND DEVICE FOR EMERGENCY TRANSPORTATION

[75] Inventor: Kazuo Hashimoto, Tokyo, Japan

[73] Assignee: Hashimoto Corporation, Tokyo, Japan

[21] Appl. No.: 116,858

[22] Filed: Nov. 5, 1987

[30] Foreign Application Priority Data

Nov. 5, 1986 [JP] Japan .................. 61-263203

[51] Int. Cl.⁴ ............................................. B64B 1/58
[52] U.S. Cl. ............................. 244/33; 244/31; 244/1 R; 244/98; 210/116
[58] Field of Search ................ 244/31, 33, 96–99, 244/1 R; 116/210, DIG. 9, 102, DIG. 14; 446/220, 222; 40/214

[56] References Cited
U.S. PATENT DOCUMENTS

| | | | |
|---|---|---|---|
| 3,140,847 | 7/1964 | Ames, Jr. ......................... | 244/1 R |
| 3,181,809 | 5/1965 | Lobelle ............................ | 244/1 R |
| 3,452,949 | 7/1969 | Maloney .......................... | 244/31 |
| 3,465,987 | 9/1969 | Harmon ........................... | 244/1 R |
| 3,583,657 | 6/1971 | Boyce .............................. | 244/1 R |
| 3,807,384 | 4/1974 | Schach ............................ | 244/31 |
| 4,042,882 | 8/1977 | Camacho ........................ | 116/210 |
| 4,494,714 | 1/1985 | Hill .................................. | 244/98 |
| 4,564,159 | 1/1986 | Hill .................................. | 244/98 |

Primary Examiner—Galen Barefoot
Assistant Examiner—Lynn M. Fiorito
Attorney, Agent, or Firm—Lowe, Price, Leblanc, Becker & Shur

[57] ABSTRACT

In the event of an earthquake or fire, important objects like a recording medium used in a location where important information to the outside are relayed or in a location where natural phenomena are observed, are carried away, hanging from an airborne balloon that is inflated and released in response to the mechanical shock of an earthquake or the heat of a fire.

6 Claims, 3 Drawing Sheets

METHOD AND DEVICE FOR EMERGENCY TRANSPORTATION

TECHNICAL FIELD

This invention relates to a method and a device for protecting equipment during an emergency. For example, when an earthquake or a fire occurs, important objects like a recording medium used in a base where important information to the outside are relayed or in a base where natural phenomena are observed, must be given refuge, and thereafter recovered.

BACKGROUND ART

In recent years, a recording medium very light in weight, like a micro cassette tape etc., is on the market, and by this medium, natural phenomena are observed and are recorded automatically. A major problem in observing natural phenomena and recording them automatically is that the recording medium could not be carried automatically from a place where the phenomena are recorded, and as a result, important recording media are damaged or burned.

DISCLOSURE OF THE INVENTION

It is an objective of the present invention to provide a method and a device for emergency transportation, wherein a recording medium in an enclosure set outside can escape from the enclosure by the shock of an earthquake or by the temperature change of a fire, by hanging from an airborne balloon which is filled with a gas and has buoyancy. After the recording medium escapes from the earthquake or fire, it can recovered on the ground by personnel shooting down the balloon.

BEST MODE FOR PRACTICING THE INVENTION

As follows, examples of the invention are explained in accordance with FIG. 1–FIG. 7.

Figure 1:
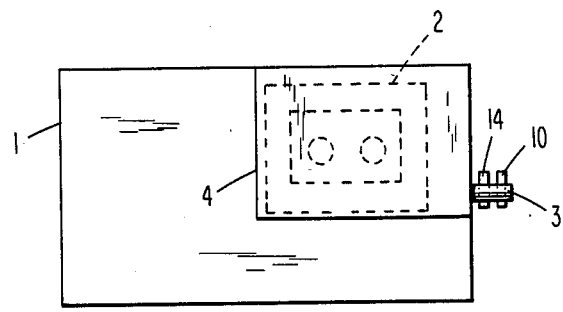
FIG. 1 is a front view of a magnetic recording device.

1 is magnetic recording device enclosure or case. The magnetic recording device 1 contains a cassette tape 2 as a recording medium. 3 in FIG. 1 is a projection for opening and closing a lid 4 which is set on the magnetic recording device 1. The projection 3 is pushed to open one side of a lid 4, and as a result, the lid is opened and a cassette tape 2 falls to a lower part of the case.

Figure 2:
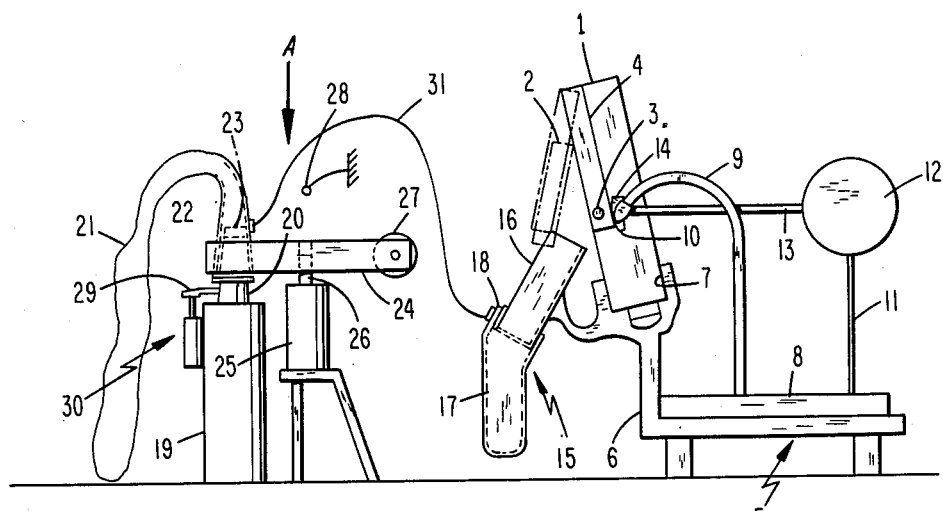
FIG. 2 is a side view of the preferred embodiment of the invention.
Figure 3:
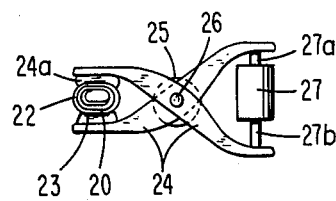
FIG. 3 is a plan view which is shown by the arrow A in FIG. 2.

5 in FIG. 2 is a supporting means, and magnetic recording device 1 is set on a concave section 7 of an upper end of a support 6 which is set on the supporting means 5. A thermal sensitive element 9 like a bimetal, shape memory metal etc., is set on a stand 8 of the supporting means 5. Thus, an extreme point 10 of a thermal sensitive element 9 contacts projection 3 and also a weight 12 as an oscillator is provided. An extreme point of a plate type elastic body 11 which is set on a stand 8 and a pushing bar 13 are extended to a side of a weight 12, and an extreme point 14 of a pushing bar 13 contacts a projection 3.

15 is a catching means set on a support 6 so that a guide 16 of a catching means 15 should guide cassette tape 2 which falls to the oblique lower part. An elastic band 18 which makes an opening portion of a keeping means 17, which is made as a bag, is fixed at the lower part of a guide 16. When the keeping means 17 breaks away from a guide 16, a signal is sent.

A gas cylinder 19 is set near a supporting means 5, and an opening position 22 of a balloon 21 which indicates marks of for example, a country, a district, a company, a kind of information on the surface of a balloon 21, is set on a nozzle 20 of the gas cylinder 19 by an adhesive 23 which is painted in the inside of an opening position 22. A pinching means 24 is set so that it should pinch the opening position 22 of the balloon 21, and also an elastic element 24a is provided on the inside of an end of the pinching means 24.

Pinching means 24 is supported by a moving-iron axis 26 of a coil 25 which is set on a side of the gas cylinder 19, and a moving-iron 27a and 27b of both ends of coil 27 are supported at a side of the pinching means 24, and also a switch 28 which contacts an upper side of a moving-iron axis 26 is set, when a moving-iron axis 26 rises up. An airtight stopper 29 is provided on the gas cylinder 19, and an airtight stopper opening means 30 which opens the airtight stopper is provided on a side of the gas cylinder 19.

The balloon 21 is connected with keeping means 17 by a string 31.

The invention is mede up as stated in the above. For example, when an earthquake occurs, a weight 12 as an oscillator which is provided on an extreme point of an elastic body 11 shakes to the right and left, and the extreme point 14 of pushing bar 13 pushes a projection 3. When a fire occurs, thermal sensitive element 9 functions and the extreme point 10 of a thermal sensitive element 9 pushes projection 3. When projection 3 is pushed by the extreme point 10 of thermal sensitive element 9, lid 4 is opened, and cassette tape 2 falls from a magnetic recording device. A magnetic recording device is guided by guide 16 of catching means 15 and the cassette tape is caught by keeping means 17. As a result, the keeping means 17 is disconnected from guide 16 as a result of mechanical shock, and elastic band 18 which is set at an opening position of keeping means 17 contracts, and cassette tape 2 is kept in keeping means 17.

When keeping means 17 is disconnected from guide 16 by the shock of the falling cassette tape 2, the airtight stopper opening means 30 which receives a signal from catching means 15, opens the airtight stopper 29 of gas cylinder 19, and at the same time, a moving-iron 27a and 27b of both ends of coil 27 which receives a signal, holds an opening portion 22 of balloon 21 which is set at nozzle 20 of gas cylinder 19 by pinching means 24 and elastic element 24a. Coil 25 which receives the signal pushes up pinching means 24 by a moving-iron axis 26 of the coil 25. At this time, opening portion 22 of balloon 21 is held by pinching means 24 and elastic element 24a, and as a result, gas does not leak from gas cylinder 19, and balloon 21 is filled with gas.

Figure 7:
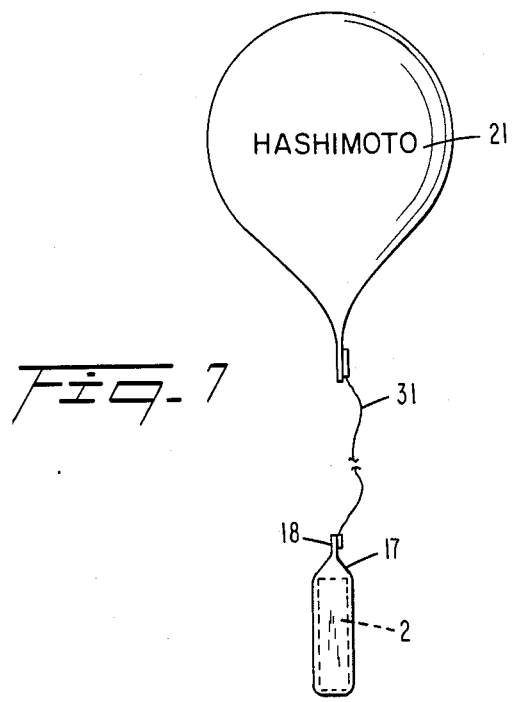
FIG. 7 is an explanatory view showing how a recording medium becomes airborned by buoyancy of a balloon.

Further, the opening portion 22 of balloon 21 which is held by pinching means 24 escapes from a nozzle 20 of gas cylinder 19, and as a result, the opening portion 22 is blocked by adhesive 23. When an upper end of moving-iron axis 26 contacts a limit switch 28, electric power to coil 27 stops being supplied, and moving-iron 27a and 27b of both ends of coil 27 project, pinching means 24 is opened, and balloon 21 is set free. As a result, balloon 21 supports keeping means 17 which holds cassette tape 2 by a string 31 and flies into the air, and protects a cassette tape 2 from an earthquake or a fire, as shown in FIG. 7. Thereafter, a mark on the surface of a balloon 21 is confirmed, the balloon is shot by a gun, and cassette tape 2 is recovered in a keeping means 17.

In the example of this invention as above, the cassette tape 2 which is within magnetic recording device 1 set on supporting means 5, escapes from the magnetic recording device 1 automatically by the shock of an earthquake or by temperature change of a fire, and is kept in a keeping means 17 of a catching means 15.

At the same time, a gas fills the balloon 21 which is connected with keeping means 17 by string 31. Thereafter, balloon 21 is separated from gas cylinder 19, and keeping means 17 which holds cassette tape 2 is set free to the air by buoyancy of balloon 21. As a result, cassette tape 2 can be protected safely from an earthquake or a fire.

It has been heretofore impossible to recover the cassette tape 2 as a recording medium in a base where important information of the outside are relayed, or in a base where natural phenomena are remotely observed, but this invention sets free a cassette tape 2 as a recording medium to the air, and thereafter, balloon 21 is shot by a gun and the cassette tape 2 can be recovered. As stated in the above, this invention advantageously can prevent disasters.

Figure 4:
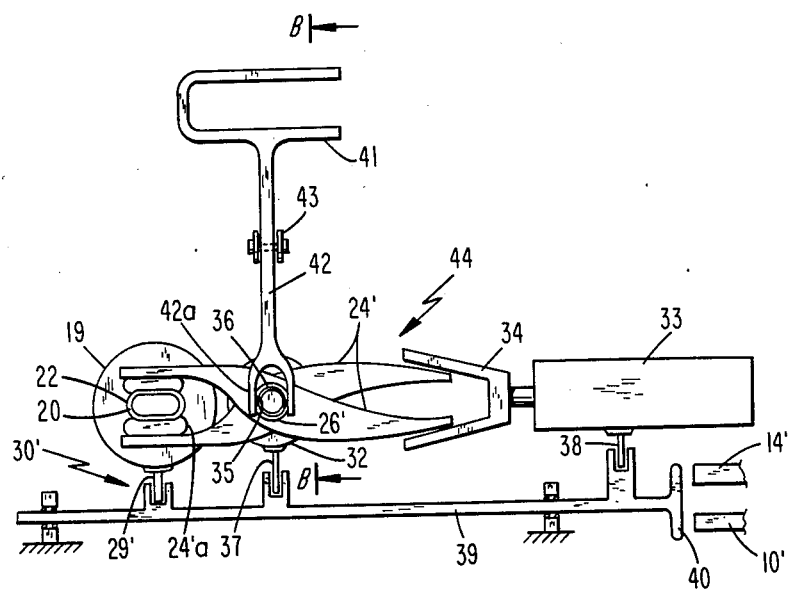
FIG. 4 is an enlarged plane view of a second example of the invention.
Figure 5:
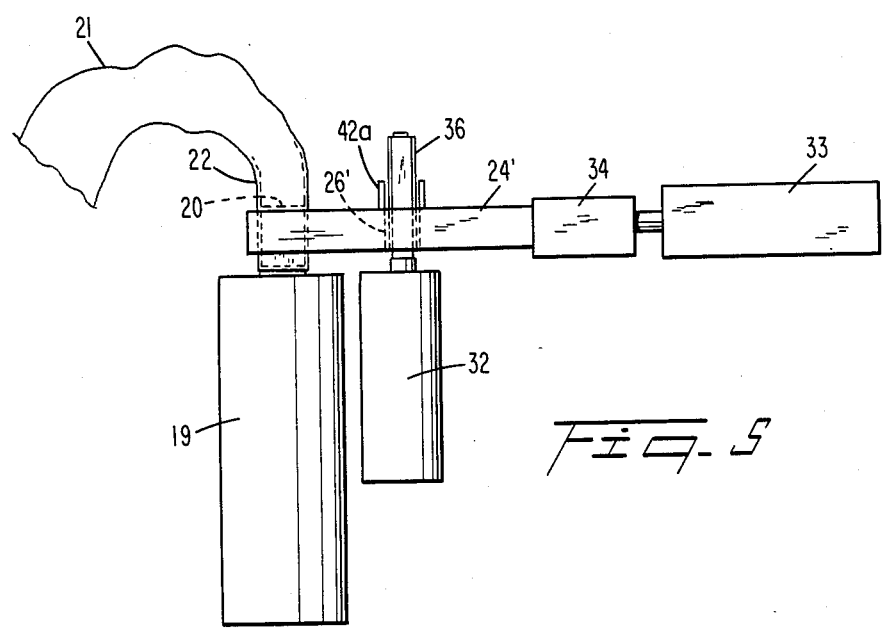
FIG. 5 is a side view of FIG. 4.
Figure 6:
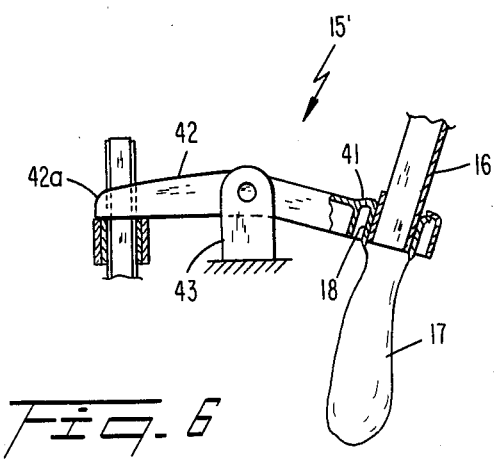
FIG. 6 is a sectional plan view along the line B—B in FIG. 4.

Another example which can function in a place where it is impossible to supply electric power, is explained in FIG. 4–FIG. 6.

A spring motor 32 is set on a side of gas cylinder 19, and a spring cylinder 33 is set horizontally to the spring motor 32 at the opposite side of gas cylinder 19. An end of a pincher 24' supported by an axis 26' is set so that the opening portion 22 of balloon 21 which is connected with nozzle 20 of gas cylinder 19 should be pinched by an elastic element 24'a, and also, the outside of other end of the pincher is held by a holding means 34 which is wider toward the outside.

A female screw which is set in the center of an axis of a pincher 24', is connected with an axis of the spring motor 32. An operation bar 39 which is connected with an airtight stopper 29' of the gas cylinder 19, with a latch 37 of spring motor 32, and with a latch 38 of spring cylinder 33, set. An extreme point 10' (like the extreme point 10 of the sensitive element 9 shown in FIG. 2), and an extreme point 14' (like the extreme point 14 of pushing bar 13 which is set at weight 12), are set to face each other at an end 40 of operation bar 39.

As shown in FIG. 4 and FIG. 6, an upper edge of an elastic band 18 which is fixed at an lower edge of a guide 16, sets a forked bar 41. An end 42a of a lever 42 which is made with the forked bar 41 in a body is set at the upper side of pincher 24,' which is set near an axis 36, and is supported by a braket 43 fixed at the middle position of the lever 42.

In this example, a catching means 15' installs keeping means 17 which has a guide 16, an elastic band 18 and a forked bar 41 in a body, and is made with a lever 42 which is supported by the braket 43. An airtight stopper opening means 30' is made by an airtight stopper 29', an operation bar 39 and extreme points 10' and 14'.

An operation of this example is explained as follows:

The extreme point 14' or 10' pushes end 40 of operation bar 39 to the left like extreme point 10 and 14 shown in FIG. 1, opens airtight stopper 29' of gas cylinder 19, and sets free latch 38 of spring cylinder 33 and latch 37 of spring motor 32. As a result, balloon 21 is filled with gas from gas cylinder 19, and a holding means 34 of a piston's end of spring cylinder 33 shifts to the left at the same time. A holding means closes another end of the pincher 24'. As a result, another end of pincher 24' closes the opening portion 22 of balloon 21 by elastic element 24'a, and leaking of the gas is stopped.

Spring motor 32 begins to turn at the same time, and pincher 24' which is supported by an axis 26' rises by a female screw 35 which is connected with an axis 36 of spring motor 32. An end of pincher 24' pushes opening portion 22 of balloon 21 and rises, and as a result, opening portion 22 escapes from nozzle 20 with pincher 24' by sliding on the surface of the outside of nozzle 20 of gas cylinder 19. The outside of another end of pincher 24' slides on the surface of the inside of a holding means 34 of an extreme point of a spring cylinder 33's piston at about same time. Also a holding means 34 escapes to the upper part, and at this time, pinching by holding means 34 is set free. As a result, opening portion 22 of balloon 21 escapes from nozzle 20 of gas cylinder 19, and the opening portion 22 of the balloon 21 is set free from pincher 24' at about same time. An end 42a of lever 42 of catching means 15' is pushed to the upper part by an upper side of pincher 24', and as a result, in FIG. 6, lever 42 turns clockwise centered around a supporting position of braket 43, and elastic belt 18 of a keeping means 17 is pushed by a forked bar 41, and keeping means 17 is set free from guide 16.

Shown in the example of FIG. 6, when keeping means 17 is set free from guide 16 by shock caused by falling of cassette tape 2, lever 42 which has forked bar 41 is supported by braket 43 in this example is not necessary, but in recent years, cassette tape 2 as a recording medium which is light in weight has been made, and as a result, when keeping means 17 cannot be set free from guide 16 by shock of falling, catching means 15' in this example is applied to this device.

As above, a supporting means 5, a catching means 15', an airtight stopper opening means 30' and a balloon setting free means 44 which make this invention, function automatically by pushing of a thermal sensitive element 9 which springs from the temperature change of a fire or by pushing of an oscillator which springs from an earthquake. As a result, this invention can save trouble about refueling fuel, charging, or exchanging an electric battery. It is very effective to set this invention out of the way. As above, a recording medium which is set in a case which is placed outside escapes from the case by the shock of an earthquake or the temperature change of a fire, and the recording medium becomes airborne by hanging from a balloon, which may be marked indicating nationality, region, firm, or information for identification as shown in FIG. 7, and which is filled with a gas and has buoyancy. After the recording medium has escaped from the earthquake or fire, it can be recovered on the ground by shooting down the balloon. As a result, when an earthquake or a fire occurs, important things which are used in a base where important information of the outside is relayed or in a base where natural phenomena are observed remotely, are taken refuge without human intervention automatically, and after they can be recovered certainly and easily. This invention is thus effective to operate.

Although certain preferred embodiments have been shown and described, it should be understood that many changes and modifications may be made therein without departing from the scope of the invention.

What is claimed is:

1. A method of an article, comprising emergency transportation for causing the article to escape from a housing wherein said article is inserted, in response to mechanical shock due to an earthquake or temperature change due to fire, sending said article into the atmosphere by suspending it from a balloon that can float with buoyancy when filled with gas, and collecting said article on the ground by shooting said balloon.

2. A device for emergency transportation, comprising:
   a supporting means for causing an article inserted in a housing to drop, down and escape from said housing in response to mechanical shock due to an earthquake or a change of temperature due to a or fire;
   a seizing means having a holding means for seizing said article once fallen;
   a balloon located close to said supporting means;
   a gas cylinder having an airtight stopper and means for engaging an opening of said balloon for filling up the balloon with a gas;
   an airtight stopper opening means for opening the airtight stopcock of said gas cylinder;
   a balloon releasing means for closing the opening of said balloon after said gas is filled up into the balloon for releasing the balloon from said gas cylinder; and
   a string having one end thereof connected to said holding means, and another end thereof connected to said balloon.

3. A device for emergency transportation and device thereof, according to claim 2, wherein said housing is a magnetic recording device and said article is a recording medium.

4. A device for emergency transportation and device thereof, according to claim 2, wherein said article is another more important article than a recording medium.

5. A device for emergency transportation and device thereof, according claim 2, wherein the balloon is marked indicating nationality, region, firm, or information for identification to make it possible to collect selectively said article on the ground by shooting said balloon.

6. A device for emergency transportation and device thereof, according to claim 2, wherein said supporting means, said seizing means, said airtight stopcock opening means and said balloon releasing means are arranged to operate in response to force by the weight of a pendulum, effected by an earthquake, or in response to pressure by a temperature deformable material effected by a fire.

* * * * *